US010824151B2

(12) United States Patent
Kim et al.

(10) Patent No.: US 10,824,151 B2
(45) Date of Patent: Nov. 3, 2020

(54) METHOD AND DEVICE FOR PROVIDING PERSONALIZED AND CALIBRATED ADAPTIVE DEEP LEARNING MODEL FOR THE USER OF AN AUTONOMOUS VEHICLE

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

(*) Notice: Subject to any disclaimer, the term of this patent is extended or adjusted under 35 U.S.C. 154(b) by 0 days.

(21) Appl. No.: 16/738,320

(22) Filed: Jan. 9, 2020

(65) Prior Publication Data

US 2020/0249675 A1    Aug. 6, 2020

Related U.S. Application Data

(60) Provisional application No. 62/799,161, filed on Jan. 31, 2019.

(51) Int. Cl.
*G05D 1/00* (2006.01)
*B60W 60/00* (2020.01)
(Continued)

(52) U.S. Cl.
CPC .......... *G05D 1/0088* (2013.01); *B60W 50/00* (2013.01); *B60W 60/00* (2020.02); *G06K 9/6256* (2013.01);
(Continued)

(58) Field of Classification Search
CPC .................................................. G05D 1/0088
See application file for complete search history.

(56) References Cited

U.S. PATENT DOCUMENTS

| | | | |
|---|---|---|---|
| 9,892,344 B1* | 2/2018 | Tran | G06K 9/66 |
| 10,579,907 B1* | 3/2020 | Kim | G06N 3/084 |
| 2016/0092788 A1* | 3/2016 | Bushmitch | G06N 20/00 706/12 |
| 2017/0032245 A1* | 2/2017 | Osband | G06N 3/0445 |

(Continued)

FOREIGN PATENT DOCUMENTS

WO    2018/224877 A1    12/2018

OTHER PUBLICATIONS https://en.wikipedia.org/w/index.php?title=Backpropagation&oldid=879675122; Wikipedia; "Backpropagation," Mar. 23, 2020.
(Continued)

*Primary Examiner* — Alex C Dunn
(74) *Attorney, Agent, or Firm* — Husch Blackwell LLP (57) ABSTRACT

A method for providing a dynamic adaptive deep learning model other than a fixed deep learning model, to thereby support at least one specific autonomous vehicle to perform a proper autonomous driving according to surrounding circumstances is provided. And the method includes steps of: (a) a managing device which interworks with autonomous
(Continued)

vehicles instructing a fine-tuning system to acquire a specific deep learning model to be updated; (b) the managing device inputting video data and its corresponding labeled data to the fine-tuning system as training data, to thereby update the specific deep learning model; and (c) the managing device instructing an automatic updating system to transmit the updated specific deep learning model to the specific autonomous vehicle, to thereby support the specific autonomous vehicle to perform the autonomous driving by using the updated specific deep learning model other than a legacy deep learning model.

16 Claims, 3 Drawing Sheets

(51) Int. Cl.
    *B60W 50/00*     (2006.01)
    *G06K 9/62*     (2006.01)
    *G06N 20/00*     (2019.01)

(52) U.S. Cl.
    CPC ............ *G06K 9/6262* (2013.01); *G06N 20/00* (2019.01); *B60W 2050/0004* (2013.01); *B60W 2420/42* (2013.01)

(56) References Cited

U.S. PATENT DOCUMENTS

| | | | | |
|---|---|---|---|---|
| 2017/0186176 A1* | 6/2017 | Paluri | ................. | G06K 9/6212 |
| 2018/0011488 A1* | 1/2018 | Nishi | .................... | G06N 3/006 |
| 2018/0012137 A1* | 1/2018 | Wright | .............. | G05B 13/0265 |
| 2018/0053102 A1 | 2/2018 | Martinson et al. | | |
| 2018/0349785 A1* | 12/2018 | Zheng | ................. | G05D 1/0088 |
| 2018/0370502 A1* | 12/2018 | Wang | ........................ | B60T 7/22 |
| 2019/0042909 A1* | 2/2019 | Sumbul | .................. | G06N 3/049 |
| 2019/0146511 A1* | 5/2019 | Hurd | .................... | G05D 1/0214 |
| | | | | 701/27 |
| 2019/0156197 A1* | 5/2019 | Dasgupta | ............. | G06N 3/0454 |
| 2019/0317513 A1* | 10/2019 | Zhang | ................. | G05D 1/0221 |
| 2019/0355483 A1* | 11/2019 | Smurro | .................. | G16H 30/20 |
| 2020/0082621 A1* | 3/2020 | Son | ........................ | G06T 19/006 |

OTHER PUBLICATIONS https://en.wikipedia.org/w/index.php?title=Automated_driving_system&oldid=876434754; Wikipedia; "Automated driving system" Mar. 24, 2020.

* cited by examiner

METHOD AND DEVICE FOR PROVIDING PERSONALIZED AND CALIBRATED ADAPTIVE DEEP LEARNING MODEL FOR THE USER OF AN AUTONOMOUS VEHICLE

CROSS REFERENCE OF RELATED APPLICATION

This present application claims the benefit of the earlier filing date of provisional patent application No. 62/799,161, filed Jan. 31, 2019, the entire contents of which being incorporated herein by reference.

FIELD OF THE DISCLOSURE

The present disclosure relates to a method and a device for use with an autonomous vehicle; and more particularly, to the method and the device for providing at least one adaptive deep leaning model calibrated and personalized for at least one user of at least one autonomous vehicle.

BACKGROUND OF THE DISCLOSURE

Recently, deep learning has drawn much attention for control of an autonomous vehicle as well as automatic recognition.

Such deep learning uses neural networks, and is being actively applied to fields of image recognition and classification and is combined with reinforcement learning and the like to show high performance beyond human ability in specific fields. Based on enhanced learning capability, without preprocessing of sensors, the deep learning is being applied to a variety of fields such as autonomous vehicles.

In particular, the autonomous vehicles use a deep learning model learned by using data collected per country or region.

However, such autonomous vehicles have a same deep learning model, which limits its ability to satisfy all drivers with different tendencies.

Accordingly, the inventors of the present disclosure propose a method of providing customized deep learning models of the autonomous vehicles that satisfy all users of the autonomous vehicles.

SUMMARY OF THE DISCLOSURE

It is an object of the present disclosure to solve all the aforementioned problems.

It is another object of the present disclosure to provide one or more calibrated and personalized deep learning models for one or more individual users of one or more autonomous vehicles.

It is still another object of the present disclosure to provide one or more customized deep learning models corresponding to the individual users of the autonomous vehicles.

It is still yet another object of the present disclosure to provide one or more optimal deep learning models optimized for the individual users of the autonomous vehicles.

In accordance with one aspect of the present disclosure, there is provided a method for providing a dynamic adaptive deep learning model other than a fixed deep learning model, to thereby support at least one specific autonomous vehicle to perform a proper autonomous driving according to surrounding circumstances, including steps of: (a) a managing device which interworks with autonomous vehicles, if a video data transmitted from the specific autonomous vehicle among the autonomous vehicles is acquired through a video storage system, instructing a fine-tuning system to acquire a specific deep learning model to be updated by using the video data from a deep learning model library storing one or more deep learning models; (b) the managing device inputting the video data and its corresponding labeled data to the fine-tuning system as training data, to thereby update the specific deep learning model; and (c) the managing device instructing an automatic updating system to transmit the updated specific deep learning model to the specific autonomous vehicle, to thereby support the specific autonomous vehicle to perform the autonomous driving by using the updated specific deep learning model other than a legacy deep learning model.

As one example, at the step of (b), the fine-tuning system instructs (i) at least one convolutional layer in the specific deep learning model to apply at least one convolutional operation to the video data, to thereby generate a feature map, (ii) at least one output layer therein to apply at least one output operation to the feature map, to thereby generate an estimated data, and (iii) at least one loss layer to generate a loss by referring to the estimated data and the labeled data and perform backpropagation by using the loss, to thereby fine-tune parameters of the specific deep learning model.

As one example, the managing device updates the specific deep learning model by fine-tuning the parameters of the specific deep learning model, to thereby support the specific deep learning model to perform the autonomous driving by referring to both a personalized optimal policy for the specific autonomous vehicle corresponding to the video data and a preset optimal policy.

As one example, the managing device acquires the labeled data by inputting the video data to at least one of an auto-labeling system and a manual-labeling system, and wherein the auto-labeling system applies an auto-labeling operation, using a certain deep learning model for labeling acquired from the deep learning model library, to the video data, to thereby generate at least part of the labeled data, and the manual-labeling system distributes the video data to each of labelers by using a distribution algorithm and acquires outputs of the labelers corresponding to the video data, to thereby generate at least part of the labeled data.

As one example, the managing device instructs (i) a label-validating system to perform a cross-validation by comparing each of parts of the labeled data generated by each of the auto-labeling system and the manual-labeling system, to thereby generate feedback information, (ii) the auto-labeling system and the manual-labeling system to determine whether to adjust said parts of the labeled data by using the feedback information and adjust said parts of the labeled data when the feedback information indicates a necessity of an adjustment, (iii) and the label-validating system to deliver the labeled data which has been validated by the label-validating system to the fine-tuning system.

As one example, the manual-labeling system performs the distribution algorithm by referring to each of at least part of characteristics of each of the labelers including at least part of workload information and efficiency information thereof.

As one example, the video storage system applies at least one prevention operation to the video data, to thereby remove private information including at least part of portrait information of people and ID information of vehicles in the video data, and then stores the video data after encrypting it.

As one example, at the step of (a), the managing device instructs the deep learning model library to find at least one among the deep learning models whose relationship score in relation to the video data is larger than a threshold, and to deliver it to the fine-tuning system as the specific deep learning model, and wherein relationship scores are calculated by using at least part of video vehicle information, video time information, video location information and video driver information of the deep learning models and the video data.

As one example, at the step of (c), the managing device acquires circumstance information of the specific autonomous vehicle by interworking with the specific autonomous vehicle, determines whether the circumstance information is in a first condition corresponding to a driving-priority circumstance or a second condition corresponding to a maintenance-priority circumstance, and transmits the specific deep learning model to the specific autonomous vehicle when the circumstance information is in the second condition.

In accordance with another aspect of the present disclosure, there is provided a computing device for providing a dynamic adaptive deep learning model other than a fixed deep learning model, to thereby support at least one specific autonomous vehicle to perform a proper autonomous driving according to surrounding circumstances, including: at least one memory that stores instructions; and at least one processor configured to execute the instructions to perform processes of: (I) if a video data transmitted from the specific autonomous vehicle among autonomous vehicles is acquired through a video storage system, instructing a fine-tuning system to acquire a specific deep learning model to be updated by using the video data from a deep learning model library storing one or more deep learning models; (II) inputting the video data and its corresponding labeled data to the fine-tuning system as training data, to thereby update the specific deep learning model; and (III) instructing an automatic updating system to transmit the updated specific deep learning model to the specific autonomous vehicle, to thereby support the specific autonomous vehicle to perform the autonomous driving by using the updated specific deep learning model other than a legacy deep learning model.

As one example, at the process of (II), the fine-tuning system instructs (i) at least one convolutional layer in the specific deep learning model to apply at least one convolutional operation to the video data, to thereby generate a feature map, (ii) at least one output layer therein to apply at least one output operation to the feature map, to thereby generate an estimated data, and (iii) at least one loss layer to generate a loss by referring to the estimated data and the labeled data and perform backpropagation by using the loss, to thereby fine-tune parameters of the specific deep learning model.

As one example, the processor updates the specific deep learning model by fine-tuning the parameters of the specific deep learning model, to thereby support the specific deep learning model to perform the autonomous driving by referring to both a personalized optimal policy for the specific autonomous vehicle corresponding to the video data and a preset optimal policy.

As one example, the processor acquires the labeled data by inputting the video data to at least one of an auto-labeling system and a manual-labeling system, and wherein the auto-labeling system applies an auto-labeling operation, using a certain deep learning model for labeling acquired from the deep learning model library, to the video data, to thereby generate at least part of the labeled data, and the manual-labeling system distributes the video data to each of labelers by using a distribution algorithm and acquires outputs of the labelers corresponding to the video data, to thereby generate at least part of the labeled data.

As one example, the processor instructs (i) a label-validating system to perform a cross-validation by comparing each of parts of the labeled data generated by each of the auto-labeling system and the manual-labeling system, to thereby generate feedback information, (ii) the auto-labeling system and the manual-labeling system to determine whether to adjust said parts of the labeled data by using the feedback information and adjust said parts of the labeled data when the feedback information indicates a necessity of an adjustment, (iii) and the label-validating system to deliver the labeled data which has been validated by the label-validating system to the fine-tuning system.

As one example, the manual-labeling system performs the distribution algorithm by referring to each of at least part of characteristics of each of the labelers including at least part of workload information and efficiency information thereof.

As one example, the video storage system applies at least one prevention operation to the video data, to thereby remove private information including at least part of portrait information of people and ID information of vehicles in the video data, and then stores the video data after encrypting it.

As one example, at the process of (I), the processor instructs the deep learning model library to find at least one among the deep learning models whose relationship score in relation to the video data is larger than a threshold, and to deliver it to the fine-tuning system as the specific deep learning model, and wherein relationship scores are calculated by using at least part of video vehicle information, video time information, video location information and video driver information of the deep learning models and the video data.

As one example, at the process of (III), the processor acquires circumstance information of the specific autonomous vehicle by interworking with the specific autonomous vehicle, determines whether the circumstance information is in a first condition corresponding to a driving-priority circumstance or a second condition corresponding to a maintenance-priority circumstance, and transmits the specific deep learning model to the specific autonomous vehicle when the circumstance information is in the second condition.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
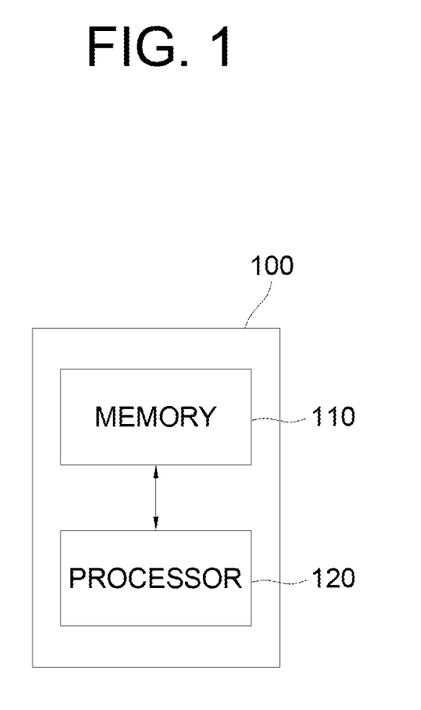
FIG. 1 is a drawing schematically illustrating a managing device 100 providing an adaptive learning system calibrated and personalized for one or more users of one or more autonomous vehicles in accordance with one example embodiment of the present disclosure.

FIG. 1 is a drawing schematically illustrating a managing device 100 providing an adaptive learning system calibrated and personalized for one or more users of one or more autonomous vehicles in accordance with one example embodiment of the present disclosure. By referring to FIG. 1, the managing device 100 may include a memory 110 for storing instructions to provide the adaptive learning system calibrated and personalized for the users of the autonomous vehicles, and a processor 120 for performing processes corresponding to the instructions in the memory 110 to provide the adaptive learning system calibrated and personalized for the users of the autonomous vehicles.

Specifically, the managing device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

And, the managing device 100 may include at least one server including one or more computing systems.

Figure 2:
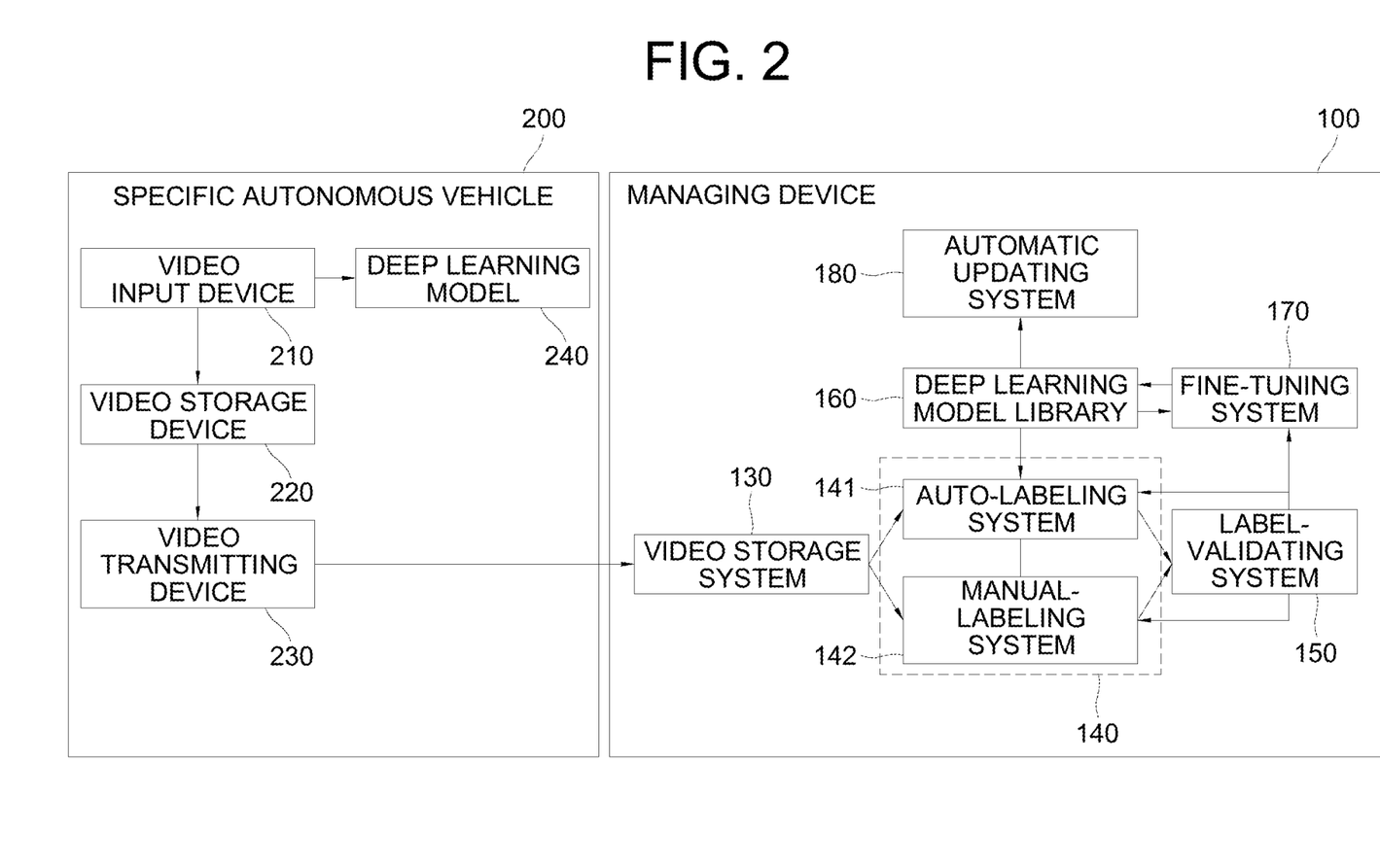
FIG. 2 is a drawing schematically illustrating a method for providing adaptive deep learning models calibrated and personalized for the users of the autonomous vehicles in accordance with one example embodiment of the present disclosure.

A method for providing the adaptive deep learning models calibrated and personalized for the users of the autonomous vehicles by using the managing device 100 in accordance with one example embodiment of the present disclosure is described by referring to FIG. 2 as follows.

A specific autonomous vehicle 200 may input one or more video images acquired by one or more video input devices 210 into a legacy deep learning model, may instruct the legacy deep learning model to determine at least one plan by using vision recognition, and may drive the specific autonomous vehicle 200 according to the determined plan. The legacy deep learning model may perform the autonomous driving until the method of the present disclosure is performed, and may be substituted with a specific deep learning model, to be explained later, acquired from the managing device 100, after the method thereof is performed.

Herein, the video input devices 210 may include at least part of at least one camera for vehicle, at least one front camera and at least one rear camera, and at least one around view monitoring (AVM) camera.

Meanwhile, the specific autonomous vehicle 200 may store the video images acquired from the video input devices 210 in a video storage device 220.

And, the specific autonomous vehicle 200 may transmit video data, which is a group of the video images during a certain time period stored in the video storage device 220, to the managing device 100 through a video transmitting device 230. Herein, the video transmitting device 230 may transmit the video data over a wireless communication network or a wired/wireless communication network.

That is, the specific autonomous vehicle 200 may temporarily store the video data acquired from the video input devices 210 in the video storage device 220, and if the video data of a preset time window or a preset volume is determined as stored, may transmit the video data to the managing device 100 by way of the video transmitting device 230.

Then, the managing device 100 may instruct a video storage system 130 to store the video data acquired from the specific autonomous vehicle 200.

Herein, the video storage system 130 may store video data acquired from the individual autonomous vehicles such that each piece of the video data corresponds to each of the users of the individual autonomous vehicles. As such, the managing device may acquire the video data from the multiple individual autonomous vehicles, but for convenience, the video data to be mentioned below may correspond to the single autonomous vehicle, i.e., the specific autonomous vehicle 200.

Also, the video storage system 130 may strip the video data, acquired from the specific autonomous vehicle 200, of private information, e.g., portrait information of people or ID information of surrounding vehicles, may encrypt the stripped video data and may store the encrypted video data.

That is, the video storage system 130 may remove the private information from the video images in the video data to prevent the private information from going public.

Next, the managing device 100 may instruct a labeling system 140 to label the video data, corresponding to the specific autonomous vehicle 200, stored in the video storage system 130, to thereby generate a labeled data. That is, the labeling system 140 may generate the labeled data which function as ground truths on the video data, to thereby allow the video data and the labeled data to be used as training data.

The labeling system 140 may label the video data using various methods, and the scope of the present disclosure on how to label the video data may not be limited thereto.

As one example, a process of labeling the video data using an auto-labeling system 141 and a manual-labeling system 142 is described.

The managing device 100 may instruct the auto-labeling system 141 to auto-label the encrypted video data, corresponding to the specific autonomous vehicle 200, stored in the video storage system 130, to thereby generate auto-labeled data. Herein, the auto-labeling system may first acquire a certain deep learning model for labeling from a deep learning model library 160, and may apply an auto-labeling operation to the video data by using the certain deep learning model for labeling, to thereby generate the auto-labeled data. The certain deep learning model for labeling may be same as the specific deep learning model to be updated, but a scope of the present disclosure may not be limited thereto.

And, the managing device 100 may instruct the manual-labeling system 142 to distribute the encrypted video data, corresponding to the specific autonomous vehicle 200, stored in the video storage system 130, to individual labelers by using a distribution algorithm, to thereby acquire manual-labeled data which is manually labeled by the individual labelers.

Herein, the manual-labeling system 142 may acquire workload information and efficiency information of each of the individual labelers, and then perform the distribution algorithm by using the workload information and the efficiency information, to thereby manage the video data distributed to the individual labelers according to workloads and labeling difficulties for each of the labelers.

Thereafter, the managing device 100 may instruct a label-validating system 150 to perform a cross-validation by comparing the auto-labeled data auto-labeled by the auto-labeling system 141 and the manual-labeled data manually labeled by the manual-labeling system 142, to thereby confirm the auto-labeled data or the manual-labeled data suspected of having labeling errors.

Specifically, the managing device 100 may compare the auto-labeled data and the manual-labeled data, thus find one or parts thereof whose similarity scores therebetween are smaller than a threshold, and may generate feedback information including information on said parts. Then, the managing device 100 may respectively deliver the feedback information to the auto-labeling system 141 and the manual-labeling system 142, to thereby re-label said parts of the auto-labeled data or the manual-labeled data suspected of having labeling errors. Thereafter, each of said parts of corrected auto-labeled data and the corrected manual-labeled data may be integrated as final labeled data, and then the final labeled data may be delivered to a fine-tuning system 170 as a part of the training data. Herein, the two corrected data may be integrated by a manager. But, if there is one which is more credible among the two corrected data, the manager may select said more credible one to be used for generating a part of the final labeled data.

And, the managing device 100 may confirm the specific deep learning model appropriate for the training data in the deep learning model library 160, and transmit the specific deep learning model to the fine-tuning system 170.

Herein, the deep learning model library 160 may classify and manage the deep learning models based on information such as place, date and time, time periods, type of the autonomous vehicles, etc. corresponding to training data used for training each of the deep learning models, or classify and manage the deep learning models currently used by the individual autonomous vehicles such that each of the deep learning models corresponds to the individual autonomous vehicles. Accordingly, the managing device 100 is capable of instructing the deep learning model library 160 to find at least one among the deep learning models whose relationship score in relation to the video data is larger than a threshold, and to deliver it to the fine-tuning system 170 as the specific deep learning model. Herein, relationship scores may be calculated by using at least part of video subject vehicle information, video subject time information, video subject location information and video subject driver information of the deep learning models and the video data. As one example, the video subject vehicle information may denote a subject vehicle, in this case the specific autonomous vehicle which filmed the video data. The video subject time information may denote a time when the video data was filmed. The video subject location information may denote a place where the video data was filmed. The video subject driver information may denote a driver in said subject vehicle. The deep learning models may have such information as its tagged data to be used for their corresponding circumstances.

Next, if the managing device 100 transmits the specific deep learning model, extracted from the deep learning model library 160, to the fine-tuning system 170, then the fine-tuning system 170 may fine-tune parameters of the specific deep learning model by using said training data including the video data and the labeled data.

That is, the fine-tuning system 170 may re-train at least part of the parameters, which have been determined by a previous training process, of the specific deep learning model by using the training data including the video data acquired from the specific autonomous vehicle 200 and its corresponding labeled data, to thereby fine-tune the parameters by updating the previously-determined parameters. Then, the specific deep learning model may adapt to the video data of the specific autonomous vehicle 200.

It will be explained more specifically, by referring to FIG. 3.

Figure 3:
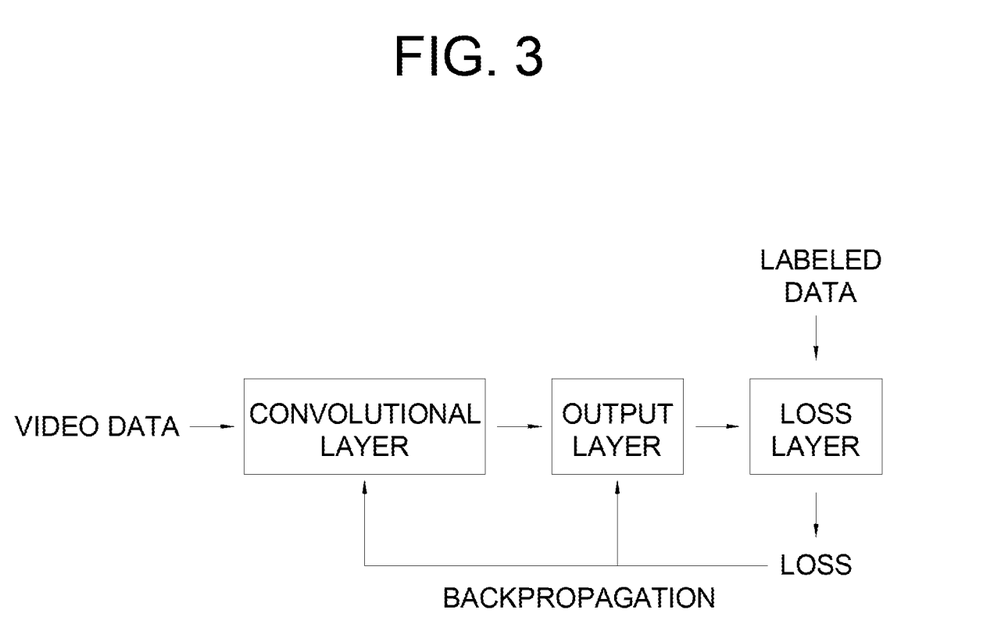
FIG. 3 is a drawing schematically illustrating a process of fine-tuning parameters of a specific deep learning model to be used for providing the adaptive deep learning models calibrated and personalized for the users of the autonomous vehicles in accordance with one example embodiment of the present disclosure.

FIG. 3 is a drawing schematically illustrating a process of fine-tuning parameters of a specific deep learning model to be used for providing the adaptive deep learning models calibrated and personalized for the users of the autonomous vehicles in accordance with one example embodiment of the present disclosure.

By referring to FIG. 3, the fine-tuning system 170 may instruct (i) at least one convolutional layer in the specific deep learning model to apply at least one convolutional operation to the video data, to thereby generate a feature map, (ii) at least one output layer therein to apply at least one output operation to the feature map, to thereby generate an estimated data, and (iii) at least one loss layer to generate a loss by referring to the estimated data and the labeled data and perform backpropagation by using the loss, to thereby fine-tune the parameters of the specific deep learning model.

As the parameters thereof are fine-tuned, not trained from scratch, the specific deep learning model may become capable of performing the autonomous driving by referring to both a preset optimal policy and a personalized optimal policy for the specific autonomous vehicle corresponding to the video data. Herein, the preset optimal policy may denote a generalized optimal policy which fits for statistically meaningful amount of people.

Next, the managing device 100 may register, e.g., update, the specific deep learning model with the fine-tuned parameters, adjusted by the fine-tuning system 170, in the deep learning model library 160.

Thereafter, the managing device 100 may instruct an automatic updating system 180 to extract and transmit the specific deep learning model with fine-tuned parameters from the deep learning library 160 to the specific autonomous vehicle 200, to thereby update the legacy deep learning model of the specific autonomous vehicle 200 to the specific deep learning model with fine-tuned parameters.

Herein, the automatic updating system may allow an update of the deep learning model if a condition, e.g., a condition regarding a status of the specific autonomous vehicle 200, satisfies at least one preset update condition. As one example, the managing device 100 may acquire circumstance information of the specific autonomous vehicle 200 by interworking with the specific autonomous vehicle, may determine whether the circumstance information is in a first condition corresponding to a driving-priority circumstance or a second condition corresponding to a maintenance-priority circumstance, and may transmit the specific deep learning model to the specific autonomous vehicle 200 when the circumstance information is in the second condition.

The present disclosure has an effect of improving satisfaction of the users with the autonomous vehicles by providing the deep learning models calibrated and personalized for the users of the autonomous vehicles.

The present disclosure has another effect of allowing optimal autonomous driving according to tendencies of the users by providing the deep learning models calibrated and personalized for the users of the autonomous vehicles.

The present disclosure has still another effect of improving safety and convenience for the users of the autonomous vehicles by providing the deep learning models calibrated and personalized for the users of the autonomous vehicles.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a dynamic adaptive deep learning model other than a fixed deep learning model, to thereby support at least one specific autonomous vehicle to perform a proper autonomous driving according to surrounding circumstances, comprising steps of:

(a) a managing device which interworks with autonomous vehicles, if a video data transmitted from the specific autonomous vehicle among the autonomous vehicles is acquired through a video storage system, instructing a fine-tuning system to acquire a specific deep learning model to be updated by using the video data from a deep learning model library storing one or more deep learning models;

(b) the managing device inputting the video data and its corresponding labeled data to the fine-tuning system as training data, to thereby update the specific deep learning model; and (c) the managing device instructing an automatic updating system to transmit the updated specific deep learning model to the specific autonomous vehicle, to thereby support the specific autonomous vehicle to perform the autonomous driving by using the updated specific deep learning model other than a legacy deep learning model, wherein the managing device acquires the labeled data by inputting the video data to at least one of an auto-labeling system and a manual-labeling system, and wherein the auto-labeling system applies an auto-labeling operation, using a certain deep learning model for labeling acquired from the deep learning model library, to the video data, to thereby generate at least part of the labeled data, and the manual-labeling system distributes the video data to each of labelers by using a distribution algorithm and acquires outputs of the labelers corresponding to the video data, to thereby generate at least part of the labeled data.

2. The method of claim 1, wherein, at the step of (b), the fine-tuning system instructs (i) at least one convolutional layer in the specific deep learning model to apply at least one convolutional operation to the video data, to thereby generate a feature map, (ii) at least one output layer therein to apply at least one output operation to the feature map, to thereby generate an estimated data, and (iii) at least one loss layer to generate a loss by referring to the estimated data and the labeled data and perform backpropagation by using the loss, to thereby fine-tune parameters of the specific deep learning model.

3. The method of claim 2, wherein the managing device updates the specific deep learning model by fine-tuning the parameters of the specific deep learning model, to thereby support the specific deep learning model to perform the autonomous driving by referring to both a personalized optimal policy for the specific autonomous vehicle corresponding to the video data and a preset optimal policy.

4. The method of claim 1, wherein the managing device instructs (i) a label-validating system to perform a cross-validation by comparing each of parts of the labeled data generated by each of the auto-labeling system and the manual-labeling system, to thereby generate feedback information, (ii) the auto-labeling system and the manual-labeling system to determine whether to adjust said parts of the labeled data by using the feedback information and adjust said parts of the labeled data when the feedback information indicates a necessity of an adjustment, (iii) and the label-validating system to deliver the labeled data which has been validated by the label-validating system to the fine-tuning system.

5. The method of claim 1, wherein the manual-labeling system performs the distribution algorithm by referring to each of at least part of characteristics of each of the labelers including at least part of workload information and efficiency information thereof.

6. A method for providing a dynamic adaptive deep learning model other than a fixed deep learning model, to thereby support at least one specific autonomous vehicle to perform a proper autonomous driving according to surrounding circumstances, comprising steps of:
(a) a managing device which interworks with autonomous vehicles, if a video data transmitted from the specific autonomous vehicle among the autonomous vehicles is acquired through a video storage system, instructing a fine-tuning system to acquire a specific deep learning model to be updated by using the video data from a deep learning model library storing one or more deep learning models;
(b) the managing device inputting the video data and its corresponding labeled data to the fine-tuning system as training data, to thereby update the specific deep learning model; and
(c) the managing device instructing an automatic updating system to transmit the updated specific deep learning model to the specific autonomous vehicle, to thereby support the specific autonomous vehicle to perform the autonomous driving by using the updated specific deep learning model other than a legacy deep learning model,
wherein the video storage system applies at least one prevention operation to the video data, to thereby remove private information including at least part of portrait information of people and ID information of vehicles in the video data, and then stores the video data after encrypting it.

7. A method for providing a dynamic adaptive deep learning model other than a fixed deep learning model, to thereby support at least one specific autonomous vehicle to perform a proper autonomous driving according to surrounding circumstances, comprising steps of:
(a) a managing device which interworks with autonomous vehicles, if a video data transmitted from the specific autonomous vehicle among the autonomous vehicles is acquired through a video storage system, instructing a fine-tuning system to acquire a specific deep learning model to be updated by using the video data from a deep learning model library storing one or more deep learning models;
(b) the managing device inputting the video data and its corresponding labeled data to the fine-tuning system as training data, to thereby update the specific deep learning model; and
(c) the managing device instructing an automatic updating system to transmit the updated specific deep learning model to the specific autonomous vehicle, to thereby support the specific autonomous vehicle to perform the autonomous driving by using the updated specific deep learning model other than a legacy deep learning model,
wherein, at the step of (a), the managing device instructs the deep learning model library to find at least one among the deep learning models whose relationship score in relation to the video data is larger than a threshold, and to deliver it to the fine-tuning system as the specific deep learning model, and wherein relationship scores are calculated by using at least part of video subject vehicle information, video subject time information, video subject location information and video subject driver information of the deep learning models.

8. A method for providing a dynamic adaptive deep learning model other than a fixed deep learning model, to thereby support at least one specific autonomous vehicle to perform a proper autonomous driving according to surrounding circumstances, comprising steps of:
(a) a managing device which interworks with autonomous vehicles, if a video data transmitted from the specific autonomous vehicle among the autonomous vehicles is acquired through a video storage system, instructing a fine-tuning system to acquire a specific deep learning model to be updated by using the video data from a deep learning model library storing one or more deep learning models;
(b) the managing device inputting the video data and its corresponding labeled data to the fine-tuning system as training data, to thereby update the specific deep learning model; and
(c) the managing device instructing an automatic updating system to transmit the updated specific deep learning model to the specific autonomous vehicle, to thereby support the specific autonomous vehicle to perform the autonomous driving by using the updated specific deep learning model other than a legacy deep learning model,
wherein, at the step of (c), the managing device acquires circumstance information of the specific autonomous vehicle by interworking with the specific autonomous vehicle, determines whether the circumstance information is in a first condition corresponding to a driving-priority circumstance or a second condition corresponding to a maintenance-priority circumstance, and transmits the specific deep learning model to the specific autonomous vehicle when the circumstance information is in the second condition.

9. A computing device for providing a dynamic adaptive deep learning model other than a fixed deep learning model, to thereby support at least one specific autonomous vehicle to perform a proper autonomous driving according to surrounding circumstances, comprising:
at least one memory that stores instructions; and
at least one processor configured to execute the instructions to perform processes of: (I) if a video data transmitted from the specific autonomous vehicle among autonomous vehicles is acquired through a video storage system, instructing a fine-tuning system to acquire a specific deep learning model to be updated by using the video data from a deep learning model library storing one or more deep learning models; (II) inputting the video data and its corresponding labeled data to the fine-tuning system as training data, to thereby update the specific deep learning model; and (III) instructing an automatic updating system to transmit the updated specific deep learning model to the specific autonomous vehicle, to thereby support the specific autonomous vehicle to perform the autonomous driving by using the updated specific deep learning model other than a legacy deep learning model,
wherein the processor acquires the labeled data by inputting the video data to at least one of an auto-labeling system and a manual-labeling system, and
wherein the auto-labeling system applies an auto-labeling operation, using a certain deep learning model for labeling acquired from the deep learning model library, to the video data, to thereby generate at least part of the labeled data, and the manual-labeling system distributes the video data to each of labelers by using a distribution algorithm and acquires outputs of the labelers corresponding to the video data, to thereby generate at least part of the labeled data.

10. The device of claim 9, wherein, at the process of (II), the fine-tuning system instructs (i) at least one convolutional layer in the specific deep learning model to apply at least one convolutional operation to the video data, to thereby generate a feature map, (ii) at least one output layer therein to apply at least one output operation to the feature map, to thereby generate an estimated data, and (iii) at least one loss layer to generate a loss by referring to the estimated data and the labeled data and perform backpropagation by using the loss, to thereby fine-tune parameters of the specific deep learning model.

11. The device of claim 10, wherein the processor updates the specific deep learning model by fine-tuning the parameters of the specific deep learning model, to thereby support the specific deep learning model to perform the autonomous driving by referring to both a personalized optimal policy for the specific autonomous vehicle corresponding to the video data and a preset optimal policy.

12. The device of claim 9, wherein the processor instructs (i) a label-validating system to perform a cross-validation by comparing each of parts of the labeled data generated by each of the auto-labeling system and the manual-labeling system, to thereby generate feedback information, (ii) the auto-labeling system and the manual-labeling system to determine whether to adjust said parts of the labeled data by using the feedback information and adjust said part of the labeled data when the feedback information indicates a necessity of an adjustment, (iii) and the label-validating system to deliver the labeled data which has been validated by the label-validating system to the fine-tuning system.

13. The device of claim 9, wherein the manual-labeling system performs the distribution algorithm by referring to each of at least part of characteristics of each of the labelers including at least part of workload information and efficiency information thereof.

14. A computing device for providing a dynamic adaptive deep learning model other than a fixed deep learning model, to thereby support at least one specific autonomous vehicle to perform a proper autonomous driving according to surrounding circumstances, comprising:
at least one memory that stores instructions; and
at least one processor configured to execute the instructions to perform processes of: (I) if a video data transmitted from the specific autonomous vehicle among autonomous vehicles is acquired through a video storage system, instructing a fine-tuning system to acquire a specific deep learning model to be updated by using the video data from a deep learning model library storing one or more deep learning models; (II) inputting the video data and its corresponding labeled data to the fine-tuning system as training data, to thereby update the specific deep learning model; and (III) instructing an automatic updating system to transmit the updated specific deep learning model to the specific autonomous vehicle, to thereby support the specific autonomous vehicle to perform the autonomous driving by using the updated specific deep learning model other than a legacy deep learning model,
wherein the video storage system applies at least one prevention operation to the video data, to thereby remove private information including at least part of portrait information of people and ID information of vehicles in the video data, and then stores the video data after encrypting it.

15. A computing device for providing a dynamic adaptive deep learning model other than a fixed deep learning model, to thereby support at least one specific autonomous vehicle to perform a proper autonomous driving according to surrounding circumstances, comprising:
at least one memory that stores instructions; and
at least one processor configured to execute the instructions to perform processes of: (I) if a video data transmitted from the specific autonomous vehicle among autonomous vehicles is acquired through a video storage system, instructing a fine-tuning system to acquire a specific deep learning model to be updated by using the video data from a deep learning model library storing one or more deep learning models; (II) inputting the video data and its corresponding labeled data to the fine-tuning system as training data, to thereby update the specific deep learning model; and (III) instructing an automatic updating system to transmit the updated specific deep learning model to the specific autonomous vehicle, to thereby support the specific autonomous vehicle to perform the autonomous driving by using the updated specific deep learning model other than a legacy deep learning model,
wherein, at the process of (I), the processor instructs the deep learning model library to find at least one among the deep learning models whose relationship score in relation to the video data is larger than a threshold, and to deliver it to the fine-tuning system as the specific deep learning model, and wherein relationship scores are calculated by using at least part of video vehicle information, video time information, video location information and video driver information of the deep learning models and the video data.

16. A computing device for providing a dynamic adaptive deep learning model other than a fixed deep learning model, to thereby support at least one specific autonomous vehicle to perform a proper autonomous driving according to surrounding circumstances, comprising:

at least one memory that stores instructions; and at least one processor configured to execute the instructions to perform processes of: (I) if a video data transmitted from the specific autonomous vehicle among autonomous vehicles is acquired through a video storage system, instructing a fine-tuning system to acquire a specific deep learning model to be updated by using the video data from a deep learning model library storing one or more deep learning models; (II) inputting the video data and its corresponding labeled data to the fine-tuning system as training data, to thereby update the specific deep learning model; and (III) instructing an automatic updating system to transmit the updated specific deep learning model to the specific autonomous vehicle, to thereby support the specific autonomous vehicle to perform the autonomous driving by using the updated specific deep learning model other than a legacy deep learning model, wherein, at the process of (III), the processor acquires circumstance information of the specific autonomous vehicle by interworking with the specific autonomous vehicle, determines whether the circumstance information is in a first condition corresponding to a driving-priority circumstance or a second condition corresponding to a maintenance-priority circumstance, and transmits the specific deep learning model to the specific autonomous vehicle when the circumstance information is in the second condition.

* * * * *